US012497282B2

(12) United States Patent
Mastro et al.

(10) Patent No.: US 12,497,282 B2
(45) Date of Patent: Dec. 16, 2025

(54) DROP-IN BEVERAGE DISPENSER

(71) Applicant: Marmon Foodservice Technologies, Inc., Osseo, MN (US)

(72) Inventors: Brian Mastro, Des Plaines, IL (US); Shishirdas Kasaragod Ravindran, Chicago, IL (US); Chris Coul, Geneva, IL (US)

(73) Assignee: Marmon Foodservice Technologies, Inc., Osseo, MN (US)

( * ) Notice: Subject to any disclaimer, the term of this patent is extended or adjusted under 35 U.S.C. 154(b) by 216 days.

(21) Appl. No.: 18/314,699

(22) Filed: May 9, 2023

(65) Prior Publication Data

US 2023/0365392 A1 Nov. 16, 2023

Related U.S. Application Data

(60) Provisional application No. 63/340,809, filed on May 11, 2022.

(51) Int. Cl.
*B67D 1/08* (2006.01)
*B67D 1/00* (2006.01)

(52) U.S. Cl.
CPC ......... *B67D 1/0857* (2013.01); *B67D 1/0021* (2013.01); *B67D 1/0066* (2013.01); *B67D 2210/00044* (2013.01); *B67D 2210/00047* (2013.01); *B67D 2210/00104* (2013.01)

(58) Field of Classification Search
CPC ................ B67D 1/0857; B67D 1/0021; B67D 1/0064–66; B67D 1/0862; B67D 2210/00044; B67D 2210/00047; B67D 2210/0006; B67D 2210/00104; B67D 2210/002; B67D 2210/003
USPC ...................................................... 222/146.6
See application file for complete search history.

(56) References Cited

U.S. PATENT DOCUMENTS

| | | | | |
|---|---|---|---|---|
| 4,940,164 | A | 7/1990 | Hancock | |
| 5,249,710 | A | 10/1993 | Hassell et al. | |
| 5,319,947 | A | 6/1994 | Fischer | |
| 5,350,086 | A | 9/1994 | Martin et al. | |
| 5,368,198 | A * | 11/1994 | Goulet | B67D 1/0057 261/DIG. 7 |
| 5,433,348 | A | 7/1995 | Deering et al. | |
| 5,487,492 | A | 1/1996 | Goulet | |

(Continued)

FOREIGN PATENT DOCUMENTS

| | | |
|---|---|---|
| WO | 2020160420 | 8/2020 |
| WO | 2024172866 A1 | 8/2024 |

OTHER PUBLICATIONS

Extended European Search Report for European Patent Application No. 23172624.1, dated Sep. 20, 2023.

(Continued)

*Primary Examiner* — David P Angwin
*Assistant Examiner* — Christopher S. Parisi
(74) *Attorney, Agent, or Firm* — Andrus Intellectual Property Law, LLP

(57) ABSTRACT

A beverage dispenser includes a plurality of dispensing heads. A cold plates includes a plurality of fluid lines running therethrough. An ice bin is in thermal contact with the cold plate. A carbonator extends vertically from the cold plate with a lower end of the carbonator in thermal contact with the cold plate. A plurality of fluid lines extend from the cold plate to the plurality of dispensing heads.

15 Claims, 13 Drawing Sheets

(56) References Cited

U.S. PATENT DOCUMENTS

| | | | | |
|---|---|---|---|---|
| 5,950,866 | A * | 9/1999 | Lancaster | B67D 1/0857 62/434 |
| 6,045,007 | A | 4/2000 | Simmons | |
| 6,155,069 | A | 12/2000 | Quartarone et al. | |
| 6,182,949 | B1 | 2/2001 | Mobbs | |
| 6,463,753 | B1 * | 10/2002 | Haskayne | B67D 1/0068 62/393 |
| 6,505,758 | B2 | 1/2003 | Black et al. | |
| 6,547,100 | B2 * | 4/2003 | Phillips | B67D 1/0877 222/129.1 |
| 6,560,972 | B2 | 5/2003 | Ubidia | |
| 6,574,981 | B2 | 6/2003 | Schroeder | |
| 6,626,005 | B2 | 9/2003 | Schroeder | |
| 6,712,342 | B2 | 3/2004 | Bosko | |
| 6,761,036 | B2 | 7/2004 | Teague et al. | |
| 6,945,070 | B1 | 9/2005 | Jablonski et al. | |
| 6,981,615 | B2 | 1/2006 | Tobler | |
| 7,337,618 | B2 | 3/2008 | Wolski et al. | |
| 7,624,895 | B2 | 12/2009 | Haskayne | |
| 7,641,074 | B2 | 1/2010 | Edwards et al. | |
| 7,669,737 | B2 * | 3/2010 | Bethuy | B67D 7/74 222/144.5 |
| 7,757,498 | B2 | 7/2010 | Wolski et al. | |
| 7,793,678 | B2 | 9/2010 | Edwards et al. | |
| 8,074,842 | B2 | 12/2011 | Edwards et al. | |
| 8,152,024 | B2 | 4/2012 | Njaastad et al. | |
| 8,251,259 | B2 | 8/2012 | Edwards et al. | |
| 8,365,956 | B2 * | 2/2013 | Edwards | G07F 13/025 222/144.5 |
| 8,365,957 | B2 | 2/2013 | Edwards et al. | |
| 8,490,834 | B2 | 7/2013 | Edwards et al. | |
| 9,010,583 | B2 | 4/2015 | Sevcik et al. | |
| 9,085,451 | B2 | 7/2015 | Santy | |
| 9,656,849 | B2 | 5/2017 | Hawken | |
| 9,718,035 | B2 | 8/2017 | Bandixen et al. | |
| 10,351,411 | B2 | 7/2019 | Ziesel | |
| 10,703,619 | B2 | 7/2020 | Njaastad et al. | |
| 10,865,090 | B2 | 12/2020 | Ziesel | |
| 2003/0071376 | A1 | 4/2003 | Bellas | |
| 2004/0118872 | A1 * | 6/2004 | Romanyszyn | B67D 1/0057 222/129.1 |
| 2006/0071015 | A1 * | 4/2006 | Jablonski | B67D 1/0021 222/1 |
| 2008/0277420 | A1 * | 11/2008 | Edwards | B67D 1/06 222/129.1 |
| 2013/0206792 | A1 | 8/2013 | Schroeder et al. | |
| 2016/0347596 | A1 * | 12/2016 | Ziesel | B67D 1/0066 |
| 2021/0214209 | A1 * | 7/2021 | Abraham | B67D 1/0862 |

OTHER PUBLICATIONS

Extended European Search Report for European Patent Appl. No. 25193189.5, dated Sep. 12, 2025.

* cited by examiner

DROP-IN BEVERAGE DISPENSER

CROSS-REFERENCE TO RELATED APPLICATIONS

The application claims priority of U.S. Provisional Patent Application No. 63/340,809, filed on May 11, 2022, the contents of which is herein incorporated by reference in its entirety.

BACKGROUND

Beverage dispensers as may be used in convenience stores, fast food service, concession stands, cafeterias or the like operate to fill individual receptacles with beverages for customers. Such beverage dispensers combine concentrated flavoring (syrup) with a still or carbonated water diluent to produce the dispensed beverage. Customer preference and operational performance favor the beverage to be dispensed in a chilled state. In general terms, water of a lower temperature can entrain a greater amount of carbon dioxide ($CO_2$) gas, providing a more carbonated beverage. Customers of carbonated beverages thus typically prefer a more carbonated and colder beverage compared to a warmer and flatter beverage.

In the settings in which such beverage dispensers are used, floor space may be held at a premium. Therefore, space efficient beverage dispensers are often preferred. One such configuration is a vertically-stacked or undercounter beverage dispenser. In such a configuration, an ice bin, a carbonator and incoming supply lines of syrup and water are arranged in a lower or "under counter" unit, while an upper or "tower" unit extends above the lower unit and is arranged for mixing and dispensing the beverages.

Another challenge for beverage dispenser is the dispense of a "casually" drawn drink, for example, one that is drawn after a comparatively long interval of non-use of the dispenser. During this time of non-use, the constituent diluent and syrup within the tower naturally warms towards the ambient temperature. In the case of a carbonated water diluent, the $CO_2$ gas may break out, e.g. separate, from the water over time and temperature increases.

Examples of existing beverage dispensers are provided in U.S. Pat. Nos. 5,249,710; 5,433,348; 5,487,492; 6,182,949; 6,463,753; 6,505,758; 6,761,036; 6,945,070; 6,981,615; 7,337,618; 7,757,498; 8,074,842; 8,152,024; 8,251,259; 8,365,956; 8,365,957; 8,490,834; 9,010,583; all of which are incorporated by reference herein in their entireties.

BRIEF DISCLOSURE

A beverage dispenser includes a plurality of dispensing heads. A cold plates includes a plurality of fluid lines running therethrough. An ice bin is in thermal contact with the cold plate. A carbonator extends vertically from the cold plate with a lower end of the carbonator in thermal contact with the cold plate. A plurality of fluid lines extending from the cold plate to the plurality of dispensing heads.

In examples, the carbonator may include a water inlet line that extends from the cold plate through a side wall of the carbonator, the side wall may be perpendicular to a bottom side and a top side, and a carbonated water outlet line may extend through the side wall of the carbonator and into the cold plate. The side wall of the carbonator may be cylindrical. A top surface of the cold plate may include a carbonator depression configured to receive the lower end of the carbonator therein. A thermal grease may be between the bottom side of the carbonator and the cold plate. A U-shaped portion of the water inlet line may be located within the beverage tower. The U-shaped portion of water inlet line fluidly connects ascending and descending portions of the water inlet line. A U-shaped portion of the carbonated water outlet line may be located within the beverage tower. The U-shaped portion of the carbonated water outlet line fluidly connects ascending and descending portions of the carbonated water outlet line.

The beverage dispenser may include a lower portion and an upper portion. The lower portion may include the carbonator, the cold plate, the ice bin, and the plurality of lower fluid lines, and is surrounded by an enclosure. The upper portion may include the beverage tower, the plurality of upper fluid lines, and the plurality of dispensing heads. A chase may extend vertically through the upper portion and is laterally centered within the upper portion. The plurality of fluid lines may extend from the cold plate and include first and second fluid line sets to a first lateral side of the chase and include third and fourth fluid line sets to a second lateral side of the chase. The first, second, third, and fourth fluid line sets may include one line of still water, one line of carbonated water, and at least two lines of syrup. Splitters may be positioned on each line of still water and each line of carbonated water to divide each line into sub lines, and each dispensing head is connected to a still water sub line and a carbonated water sub line. A still water sub line, a carbonated water sub line, and at least one syrup line from the second fluid line set are diverted into the chase and are connected to a first dispensing head, of the plurality of dispensing heads, mounted to the central chase. A still water sub line, a carbonated water sub line, and at least one syrup line from the third fluid line set are diverted into the chase and are connected to a second dispensing head, of the plurality of dispensing heads, mounted to the central chase.

Still further examples of the beverage dispenser include a vertical chase. The vertical chase separates the plurality of lower fluid lines into a first group of lower fluid lines and a second group of lower fluid lines, and the vertical chase separates the plurality of upper fluid lines into a first group of upper fluid lines and a second group of upper fluid lines. The first group of lower fluid lines are connected to the first group of upper fluid lines and located to a first lateral side of the chase and the second group of lower fluid lines are connected to the second group of upper fluid lines and located to a second lateral side of the chase. The first group of lower fluid lines may extend within a first vertical insulation housing and the first vertical insulation housing is filled with insulation. The first group of upper fluid lines may include a first fluid line set and a second fluid line set. Each of the first fluid line set and the second fluid line set includes a still water line, a carbonated water line, a first flavoring line, and a second flavoring line. Splitters on each still water line divide each still water line into still water sub lines. Splitters on each carbonated water line divide each carbonated water line into carbonated water sub lines.

The plurality of dispensing heads includes a first, second, third, and fourth dispensing head. The still water sub lines of the first fluid line set are fluidly connected to the first and second dispensing heads and the still water sub lines of the second fluid line set are fluidly connected to the third and fourth dispensing heads. The carbonated water sub lines of the first fluid line set are fluidly connected to the first and second dispensing heads and the carbonated water sub lines of the second fluid line set are fluidly connected to the third and fourth dispensing heads. The first flavoring line of the first fluid line set is fluidly connected to the first dispensing head. The second flavoring line of the first fluid line set is fluidly connected to the second dispensing head. The first flavoring line of the second fluid line set is fluidly connected to the third dispensing head. The second flavoring line of the second fluid line set is fluidly connected to the fourth dispensing head.

The plurality of dispensing heads includes a first, second, third, and fourth dispensing head. The first fluid line set and the second fluid line set each further comprise a third flavoring line. The still water sub lines of the first fluid line set are fluidly connected to the first and second dispensing heads and the still water sub lines of the second fluid line set are fluidly connected to the third and fourth dispensing heads. The carbonated water sub lines of the first fluid line set are fluidly connected to the first and second dispensing heads and the carbonated water sub lines of the second fluid line set are fluidly connected to the third and fourth dispensing heads. The first flavoring line of the first fluid line set is fluidly connected to the first dispensing head. The second flavoring line of the first fluid line set is fluidly connected to the second dispensing head. The third flavoring line of the first fluid line set is fluidly connected to the third dispensing head. The first, second, and third flavoring lines of the second fluid line set are fluidly connected to the fourth dispensing head.

A horizontal insulation housing may extend from the vertical insulation housing. The plurality of dispensing heads may include a first, second, third, and fourth dispensing heads. A still water subline and a carbonated water subline of the second fluid line set are connected to the fourth dispenser head through the horizontal insulation housing. At least one flavoring line of the first flavoring line and the second flavoring line is connected to the fourth dispenser head through the horizontal insulation housing. A first group of upper fluid lines extend within the first vertical insulation housing. A second group of upper fluid lines extend within the second vertical insulation housing. A portion of the fluid lines of the first group of upper fluid lines extend out of the first vertical insulation housing and through the horizontal insulation housing to connect to a first dispenser head of the plurality of dispenser heads. A portion of the fluid lines of the second group of upper fluid lines extend out of the second vertical insulation housing and through the horizontal insulation housing to connect to a second dispenser head of the plurality of dispenser heads.

DETAILED DISCLOSURE

Figure 1:
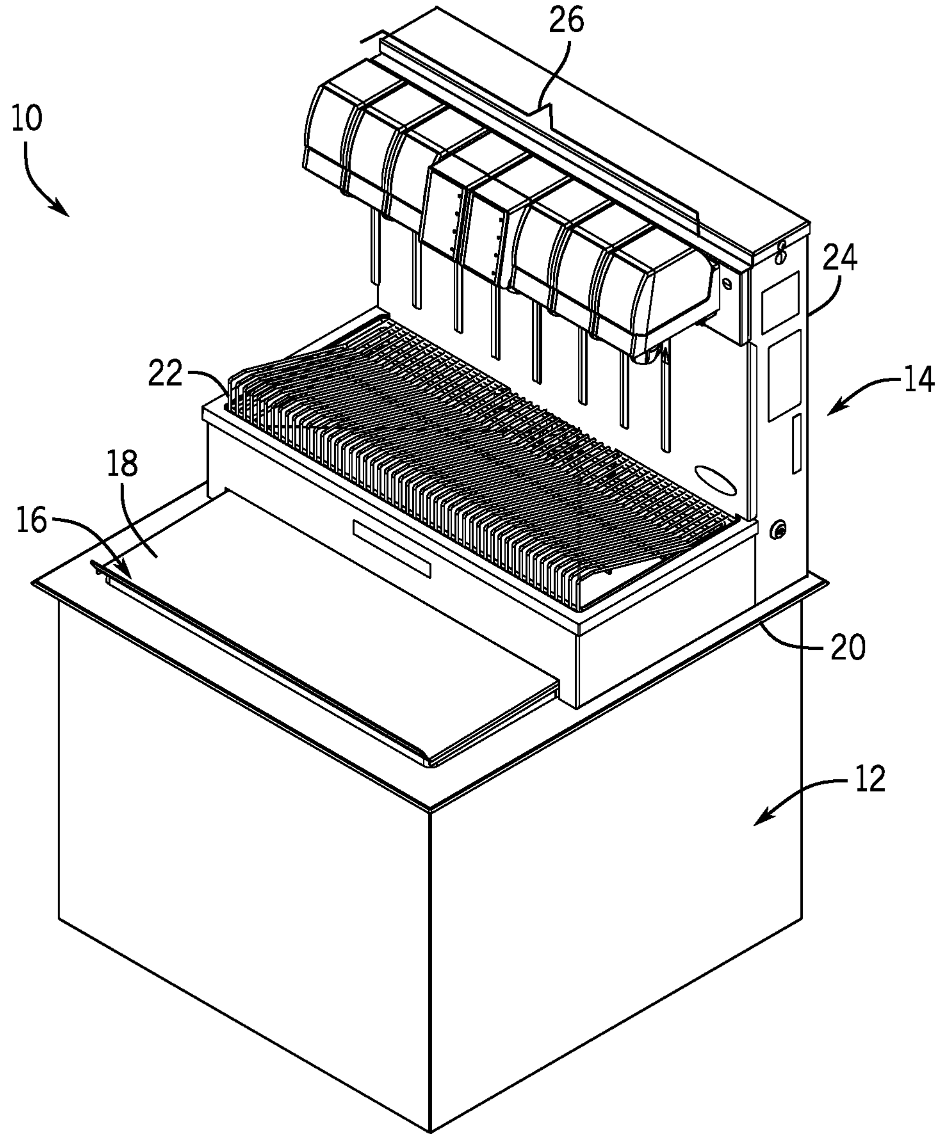
FIG. 1 is a front perspective view of an example of a beverage dispenser.

A beverage dispenser 10 is configured as an undercounter dispensing system. Square footage of kitchen or food and drink order assembly areas may be at a premium in certain restaurant service settings. Therefore, vertically arranged dispensing systems present a space efficient solution for beverage dispensing. The beverage dispenser 10 includes a lower portion 12 and an upper portion 14. The lower portion 12 defines an ice bin 16 which is configured to retain a supply of pre-made cubed ice in a thermally insulated environment as described in further detail herein. A movable lid 18 helps to maintain the environment of the ice bin 16. The lower portion 12 and the ice bin 16 are configured to be positioned below a counter (not depicted), as exemplified by a counter flange 20 configured to mount the beverage dispenser 10 to the counter. The upper portion 14 includes a drip tray 22 and a beverage tower 24. A plurality of dispensing heads 26 are mounted to the beverage tower 24 at a position above the drip tray 22. The dispensing heads 26 are configured to each dispense one or more flavor of beverage therefrom. As a point of reference, the dispensing heads 26 are generally referred to herein in a numbered order from left to right as shown in FIG. 1 (e.g. dispensing heads #1-#8). However, it will be recognized that the dispensing heads 26 may be numbered or referenced right to left or in other manners while remaining within the scope of the present disclosure. In another example, the dispensing heads 26 may be referenced as lateral dispensing heads 53 and center dispensing heads 54 as detailed further herein.

Figure 2:
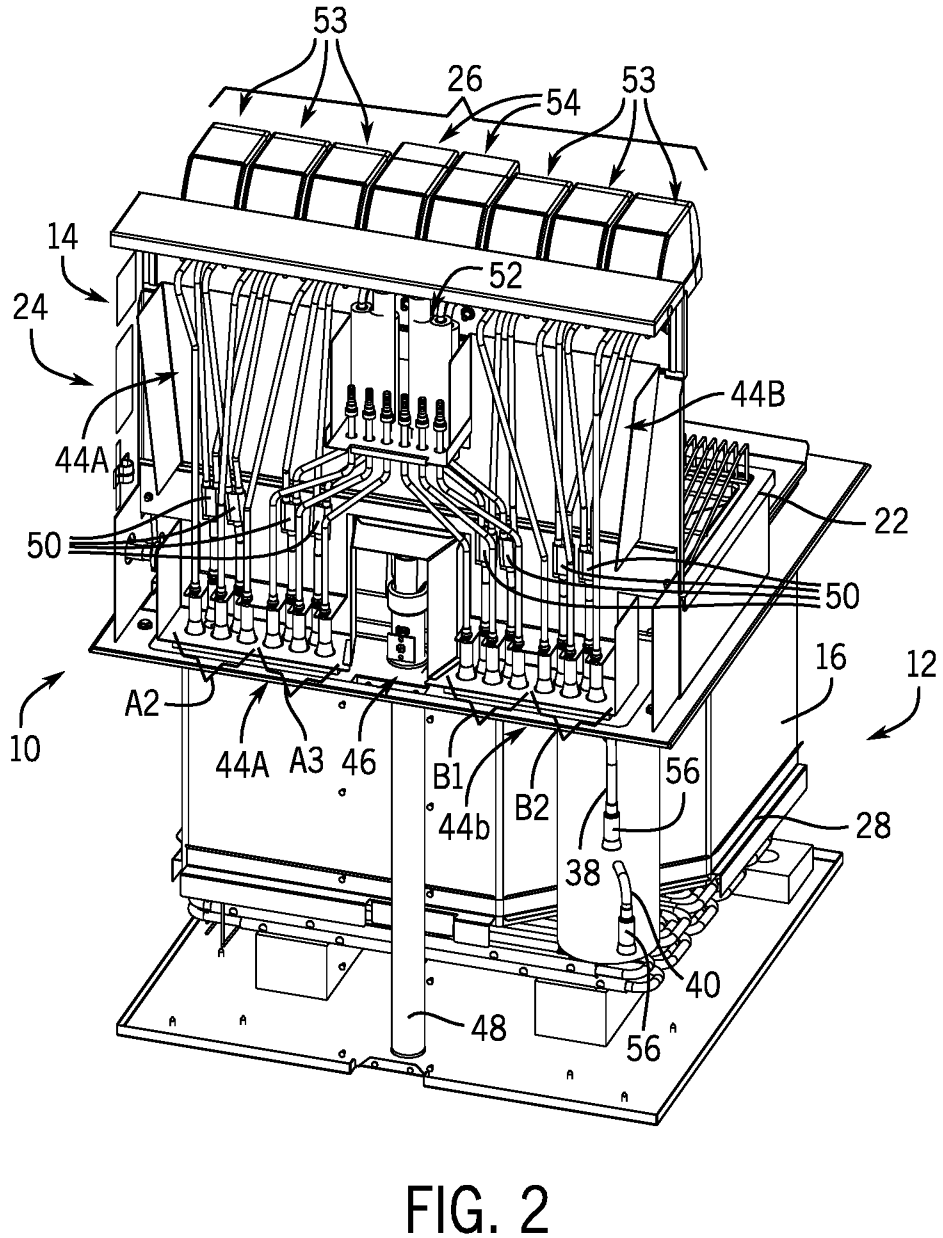
FIG. 2 is a rear perspective view of an example of a beverage dispenser with a portion of the cladding removed.

The beverage dispenser 10 is generally constructed with an aluminum or stainless steel cladding defining the exterior of the beverage dispenser 10. FIG. 2 is a rear-perspective view of one example of the beverage dispenser 10 with cladding removed from the lower portion 12 and from the beverage tower 24. It will be recognized that in examples as described herein, that foam insulation may fill the spaces between the components shown and the exterior cladding. Such foam insulation helps to retain components of the lower portion 12 and the beverage tower 24 in their respective positions, as well as to thermally isolate the components to maintain chilled temperatures of e.g. ice, water, and syrup within the beverage dispenser 10.

In the lower portion 12, the ice bin 16 rests upon a cold plate 28. The cold plate 28 is cast or otherwise constructed from a thermally-conductive material, for example aluminum. As will be described in further detail herein, the cold plate 28 is in thermal contact with the ice bin 16 such that the ice in the ice bin 16 cools the cold plate 28. Still water, carbonated water, and syrup lines run through the cold plate 28. The cold plate, cooled by the cubed ice in the ice bin 16, cools or maintains a chilled condition of the still water, carbonated water, and syrup liquids prior to dispensing of the liquids in response to an actuation of one of the dispensing heads 26. It will be recognized that for the sake of simplicity, some fluid lines of the lower portion 12 are not depicted in FIG. 2. The ice bin 16 is defined by a plurality of bin walls 17, which extend vertically to define the perimeter and height of the ice bin. In an example, the cold plate 28, and particularly an ice surface 29 of the cold plate 28 forms the bottom of the ice bin 16. This promotes thermal contact between the cubed ice held by the ice bin 16 and the cold plate 28. As the cubed ice melts, the meltwater is directed out through a drain 31 in the ice surface 29 of the cold plate 28.

Figure 3A:
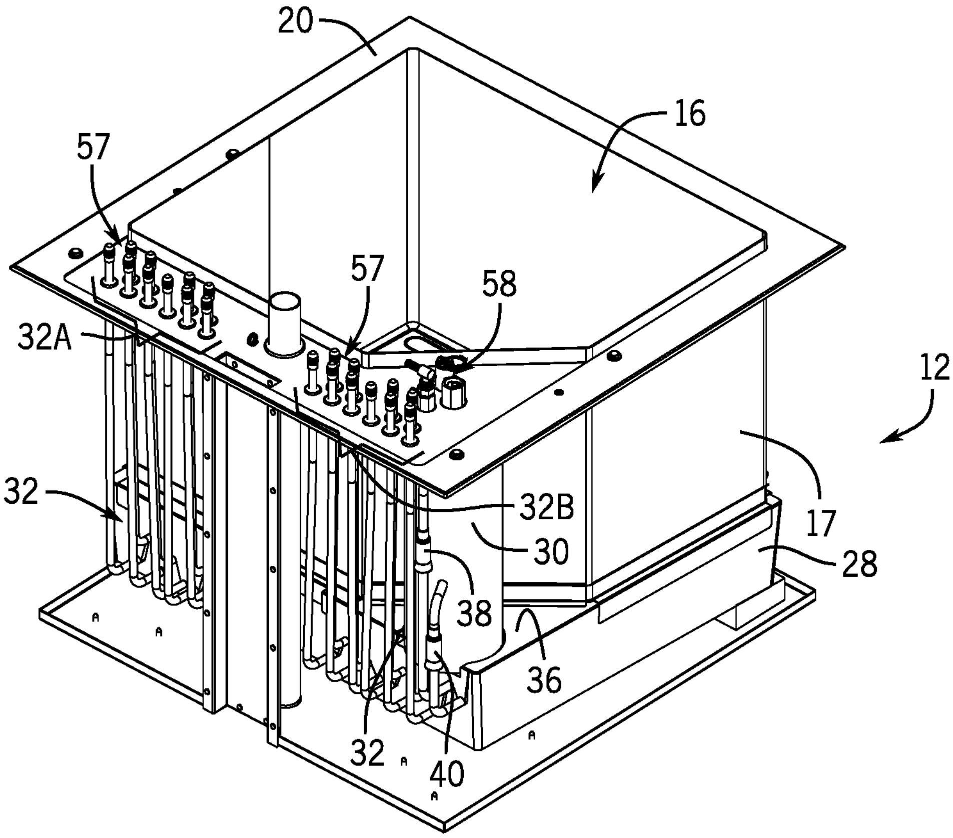
FIGS. 3A-3C provide further perspective views of the lower portion, cold plate, and carbonator.
Figure 3B:
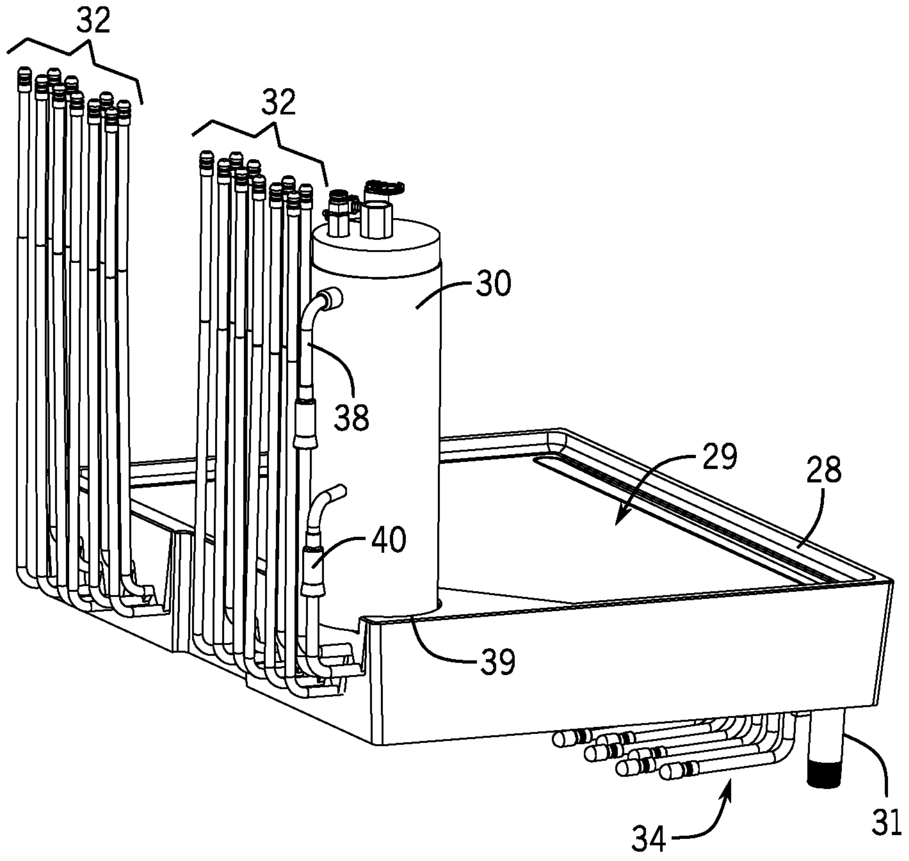
Figure 3C:
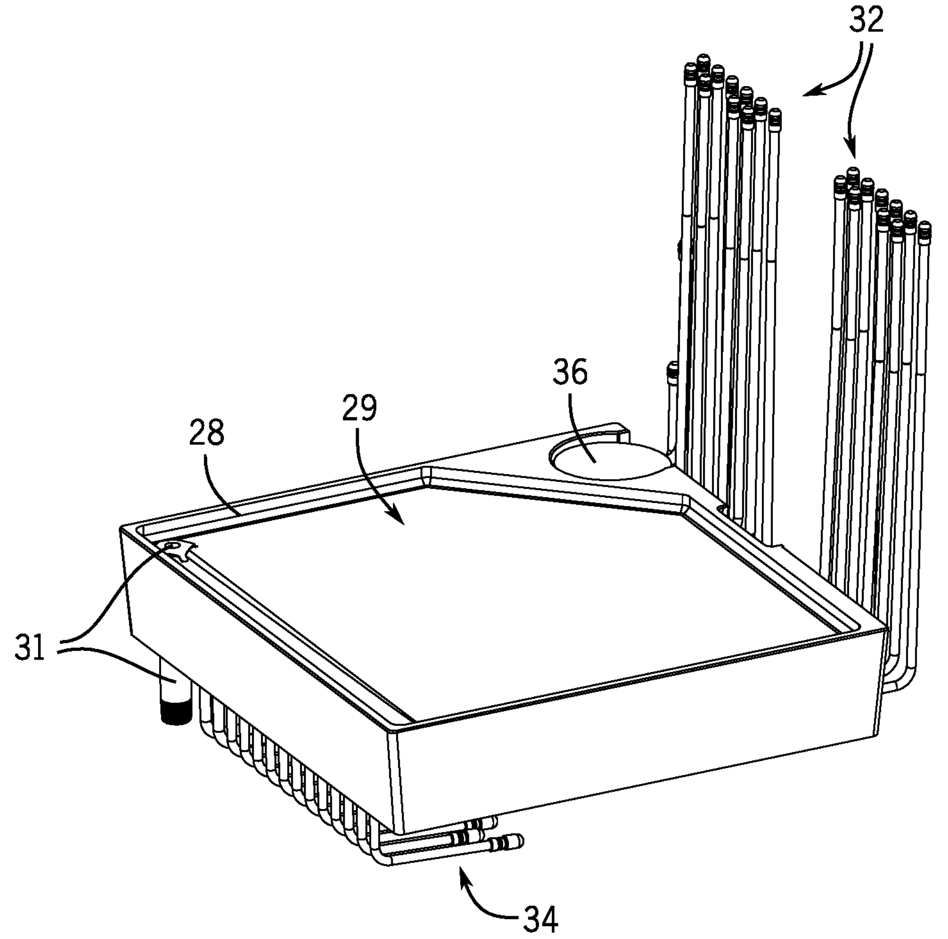

FIGS. 3A-3C depict the lower portion 12, cold plate 28, and carbonator 30 in isolation and perspective. The carbonator 30 is shaped as a cylinder and will be described in further detail herein. The carbonator 30 is oriented vertically and rests on one end on the cold plate 28. A thermal grease may be placed between the end of the carbonator 30 and the cold plate 28. The thermal grease may exemplarily be an asbestos free, non-drying mastic, such as may be available from H. B. Fuller Company of St. Paul, Minnesota. The thermal grease may aid in the conduction of heat between the carbonator 30 and the cold plate 28. The liquids (still water, carbonated water, syrup) run in lines through the cold plate 28 to cool the liquids in the lines. Lower fluid lines 32 extend from the cold plate 28 and vertically out of the lower portion 12 at the counter flange 20 in groups as described herein. FIGS. 3B and 3C better depict fluid inlet lines 34 into the cold plate 28. FIGS. 3B and 3C also further depict a carbonator depression 36 which may be formed into the material of the cold plate 28 to define a position of the carbonator 30 thereon.

FIGS. 3A-3C further depict the water inlet line 38 from the cold plate 28 to the carbonator 30 which is configured to provide still water that has been cooled by the cold plate 28 into the carbonator 30. Carbonated water outlet line 40 extends from the carbonator 30 back into the cold plate 28. The carbonated water outlet line 40 is configured to provide carbonated water back into the cold plate 28 to be held in a chilled condition and on demand until drawn upon by one or more of the dispensing heads 26 to dispense a carbonated beverage.

Figure 4:
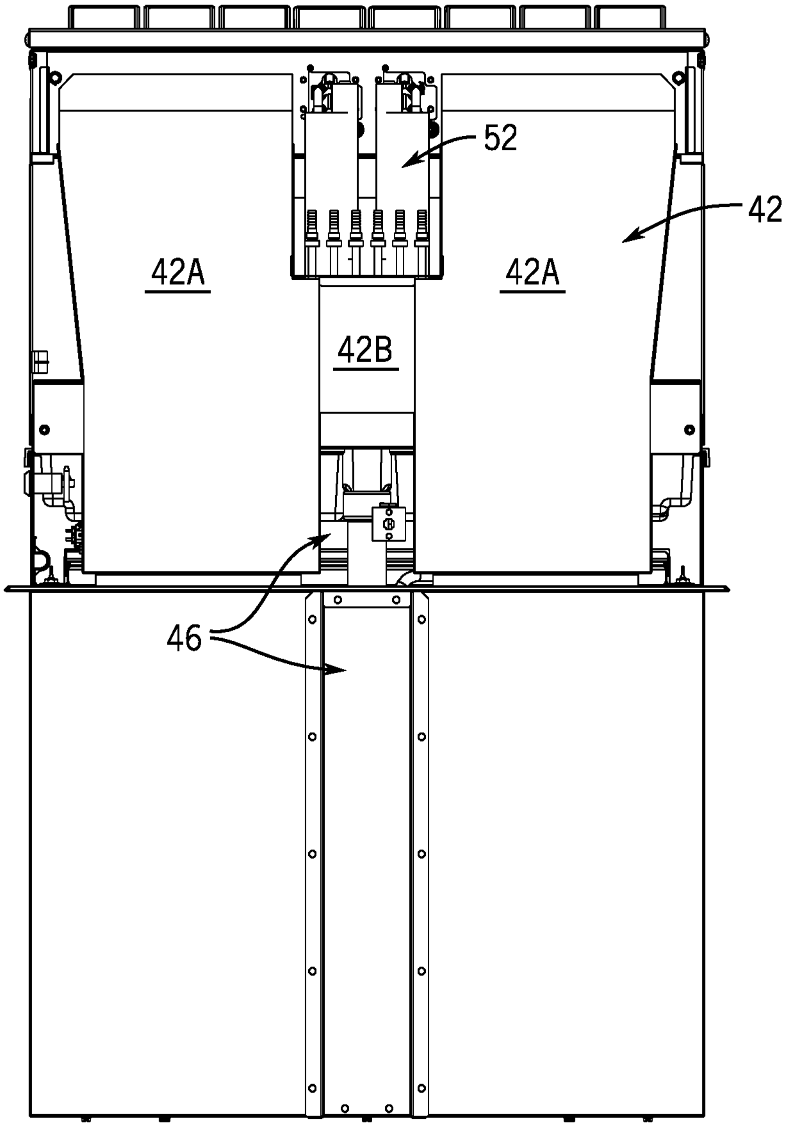
FIG. 4 is a rear view of the beverage dispenser with the beverage tower cladding removed.

FIG. 4 is a rear view of the beverage dispenser with the cladding removed from the beverage tower 24. An insulation housing 42 surrounds the network of upper fluid lines 44 (FIG. 2, 5) which extend through the beverage tower 24 and will be described in further detail herein. The insulation housing 42 is exemplarily constructed of sheet metal and defines space about the upper fluid lines 44, the space being filled with a foaming insulation to insulate around the upper fluid lines 44. The insulation housing 42 exemplarily includes three portions. Vertical portions 42A are located to the lateral sides of the beverage tower 24 and extend for the height of the fluid lines 44 in the vertical dimension. The vertical portions 42A are connected by a horizontal portion 42B which is positioned in the interior of the beverage tower 24 with open space above and below the horizontal portion 42B. The horizontal portion 42B insulates fluid lines 44 which extend medially towards the center line of the beverage tower 24, as will be explained herein.

Figure 5:
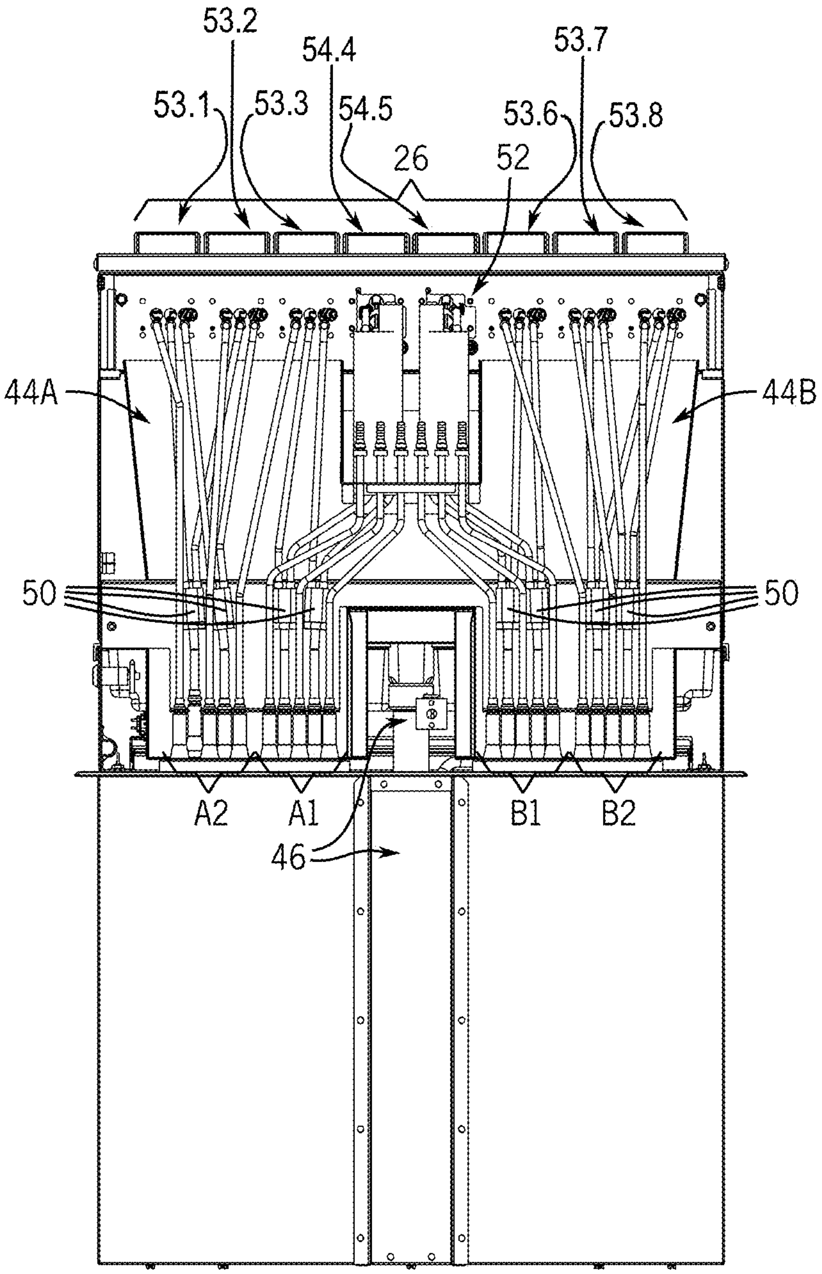
FIG. 5 is a rear view of the beverage dispenser with the beverage tower and lower portion claddings removed.

FIG. 5 is the rear view of FIG. 4, with the insulation housing 42 and any insulation therein removed for ease of depiction. With reference additionally to FIG. 2, the upper fluid lines 44 extend generally vertically from the bottom of the beverage tower 24 which is connected to the lower portion 12. The upper fluid lines 44 extend through the beverage tower 24 to the dispensing heads 26. The upper fluid lines 44 are arranged into two groups 44A, 44B of laterally spaced fluid lines. By laterally spacing apart the two groups 44A, 44B of fluid lines, a central chase 46 is provided for conduit 48 which may provide for electrical connections between the lower portion 12 and the upper portion 14. In examples, the central chase 46, which further extends forward of the horizontal portion 42B is uninsulated and a supply of ambient-temperature water provided therein.

The two groups 44A, 44B of the upper fluid lines 44 are further divided into respective sets A1, A2, B1, B2, each set of fluid lines configured to support one or more dispensing heads 26 with diluent (still and carbonated water) and beverage syrup as explained herein. In the examples shown, the beverage dispenser 10 includes eight dispensing heads 26. Each set includes a line for still water, carbonated water, and as will be described herein 2 or 3 lines of syrup depending upon the configuration of the beverage dispenser 10. Both the still water line and the carbonated water line include a splitter 50 which divides those water lines into two water lines. The splitter 50 may be any type of fluid junction that diverts a flow of fluid into multiple, for example two or more, streams. Such splitter may be, but is not limited to a "Y" or "T" connector or a flow manifold. In this manner, both still and carbonated water can be provided to both of the dispensing heads 26 supplied by each fluid line set A1, A2, B1, B2. It has been determined that construction of the beverage tower to provide still and carbonated water to each of the dispensing heads enables efficient construction and operation of the beverage tower 24 while providing flexibility of configuration and use of the beverage dispenser to dispense a combination of carbonated and still beverages at each of the dispensing heads 26.

FIGS. 2 and 5 depict an example of a beverage dispenser configuration in which each fluid line set (A1, A2, B1, B2) includes a still water line, a carbonated water line, and three lines of syrup. The laterally positioned sets A2, B2 each supply still and carbonated water to two of the lateral dispensing heads 53 on each side (e.g. positions #1, #2, #7, #8, represented as 53.1, 53.2, 53.7, and 53.8 respectively). Fluid line sets A2 and B2 further supply syrup to all of the lateral dispensing heads 53 (e.g. positions #1, #2, #3, #6, #7, #8, represented as 53.1, 53.2, 53.3, 53.6, 53.7, and 53.8 respectively). The medially positioned fluid line sets A1, B1 have the same structural configuration of fluid lines as the laterally positioned fluid line sets A2, B2 (e.g. still water line, carbonated water line, three syrup lines). Instead medially positioned fluid line sets A1, B1 supply still and carbonated water to the dispensing heads 26 at the #3 and #6 positions of the lateral dispensing heads 53 and supply still and carbonated water to the dispensing heads 26 of the center dispensing heads 54 (e.g. in positions #4 and #5, represented as 54.4 and 54.5 respectively). Each fluid line set A1, B1 provides all of the lines of syrup to a single dispensing head 26 of the center dispensing heads 54. The medially positioned fluid line sets A1, B1 respectively provide all three lines of syrup to a central junction 52, which is the uppermost portion of the central chase 46. In the beverage dispenser 10 of FIGS. 2 and 5, the center dispensing heads 54 (e.g. in positions #4 and #5, represented as 54.4 and 54.5 respectively) of the dispensing heads 26, are configured for additional flexibility, for example to offer seasonal, regional, or limited offer beverages, or to provide dispensing heads 54 with integrated flavor selection or combination (e.g. vanilla, cherry, or regular cola). It will be recognized that fluid lines (not depicted), exemplarily flexible tubing, complete the fluid connection to the respective center dispensing heads 54 from each of the fluid lines of sets Al and B1 extending into the central junction 52. Therefore, all three flavoring lines from the medially positioned fluid line sets A1, B1 angle medially to the central junction 52. Still and carbonated lines are also routed medially from the medially positioned fluid line sets to the central junction 52. As noted previously, ambient still water may further be provided to the central junction 52, through fluid lines in the central chase 46. The central junction 52 is defined in part by the absence of the insulation housing 42, providing the space for the central junction 52. With the components within the central junction 52 exposed (interior of the cladding of the beverage tower 24). The center dispensing heads 54 may be efficiently re-connected to flavoring and diluent lines to change beverage offerings.

Figure 6:
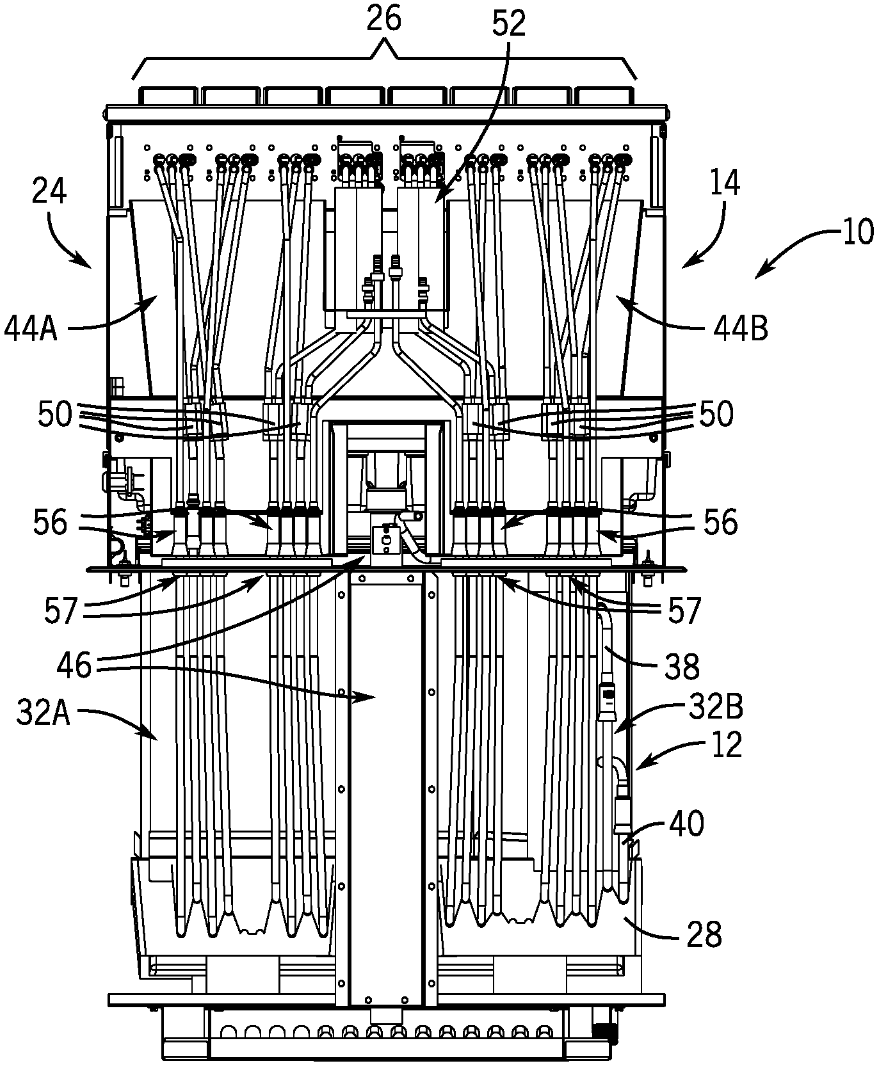
FIG. 6 is a rear view of the beverage dispenser with a second configuration of fluid lines.
Figure 7:
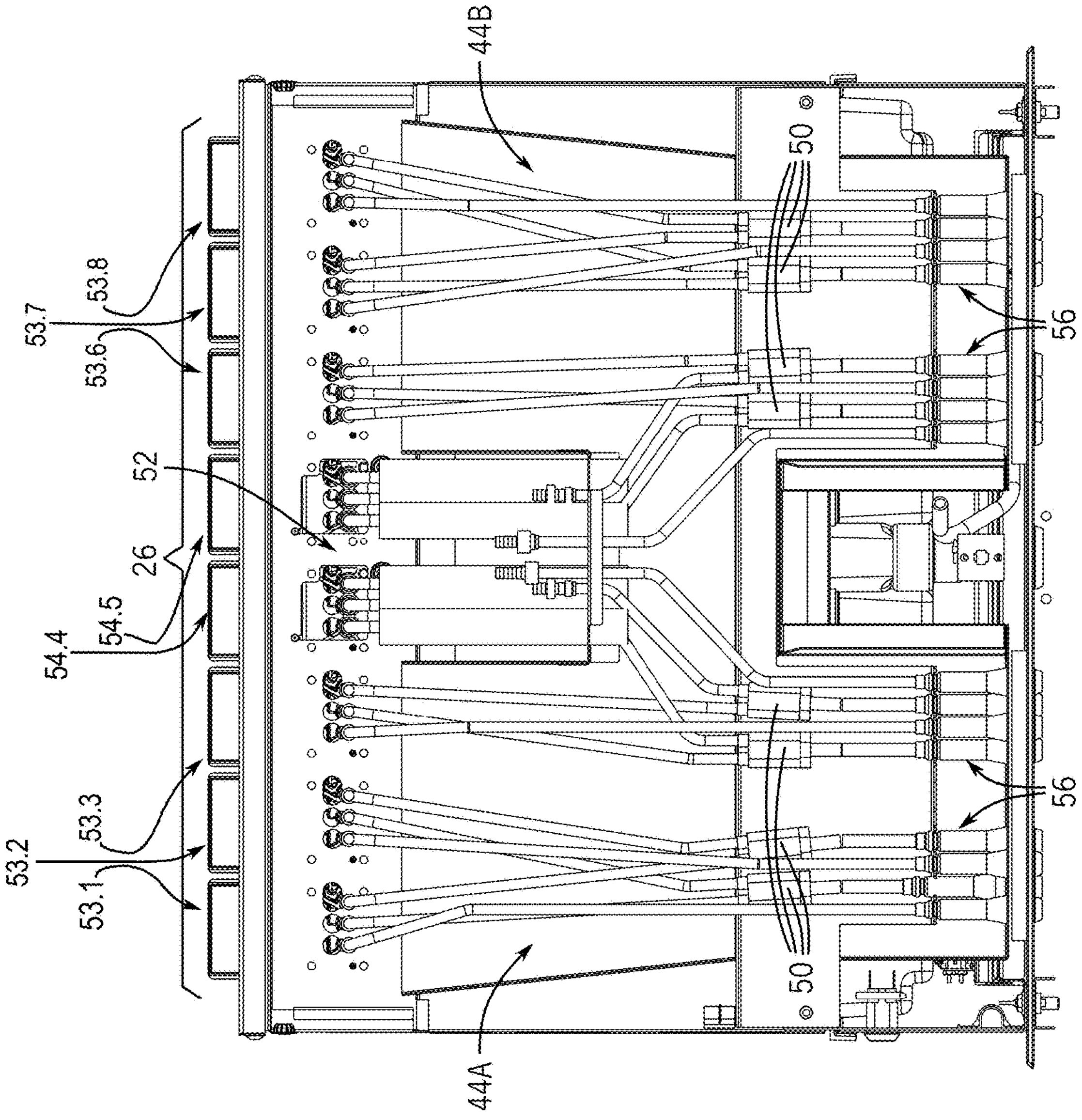
FIG. 7 is a detailed rear view of the beverage dispenser upper portion of FIG. 6
Figure 8:
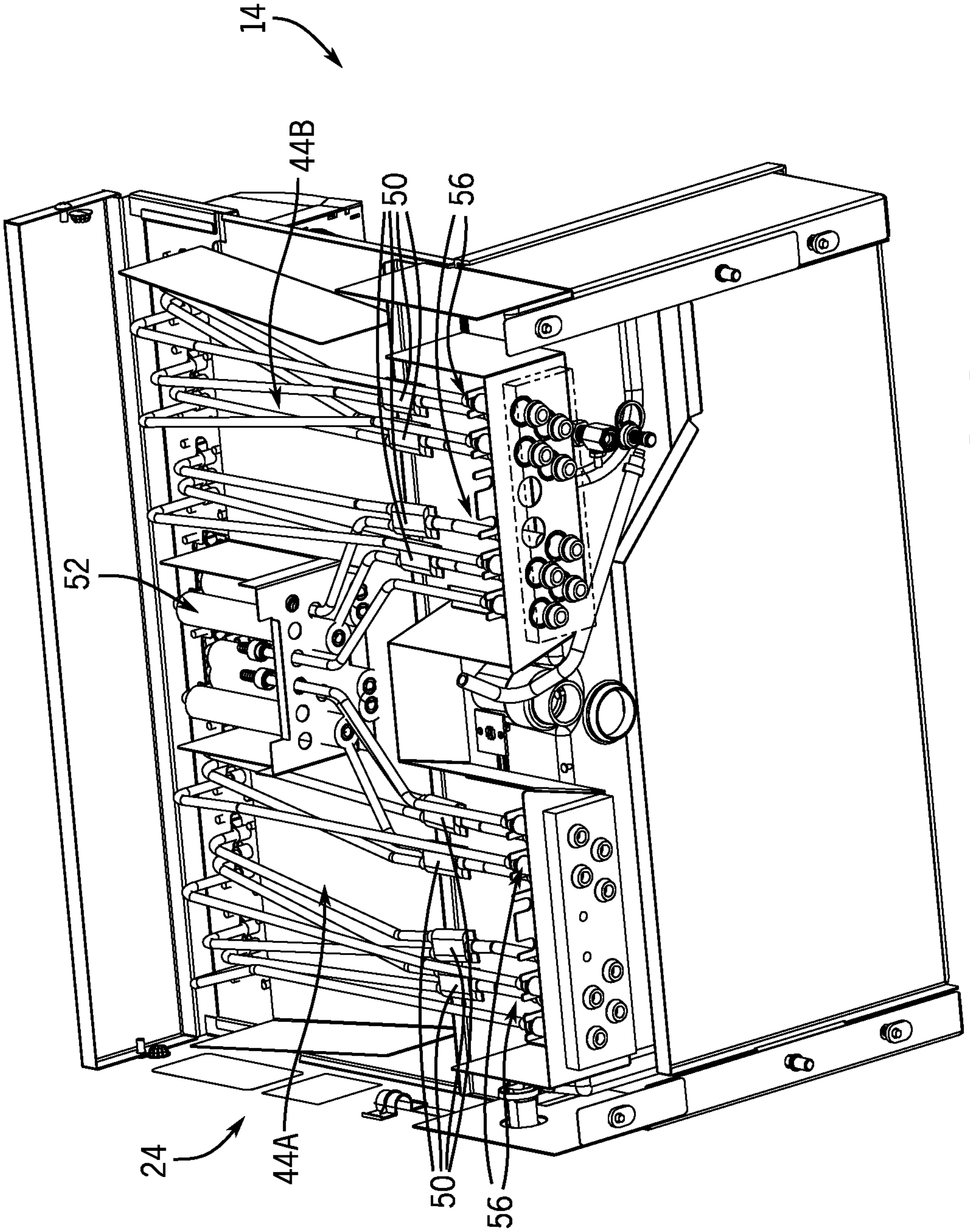
FIG. 8 is a rear bottom perspective view of the beverage dispenser upper portion of FIG. 6.

FIGS. 6-8 provide further disclosure of the beverage dispenser 10 generally while also providing an example of a second arrangement of the fluid lines 44 within the beverage dispenser 10. FIG. 6 is a rear view of the beverage dispenser 10 with the cladding removed from the lower portion 12 and the beverage tower 24. The lower fluid lines 32A and 32B extend generally vertically from the cold plate 28 and extend through the counter flange 20 as shown in FIG. 3A. The upper portion 14 of the beverage dispenser 10 houses the upper fluid lines 44A, 44B within the beverage tower 24. Each of the upper fluid lines 44A, 44B includes a fitting 56 configured to receive therein a mating fitting end 57 of a corresponding lower fluid line 32A, 32B.

Referring specifically to the example shown in FIGS. 6-9, each fluid line set A1, A2, B1, B2 includes two lines of flavoring, a line of still water, and a line of carbonated water, for a total of 4 lines in each fluid line set. As in the previously described example, the still and carbonated water lines are both split with splitters 50, while the flavoring line from the laterally positioned fluid line sets A2, B2 are provided one each to the outermost four dispensing heads 26 (e.g. the dispensing heads in positions #1, 2, 7, and 8). The main difference in the configuration depicted between FIGS. 2, 4 and 5 versus FIGS. 6-9 is that the center two dispensing heads (e.g. positions #4 and 5 are configured for dispense of a single beverage flavoring and therefore the medially positioned fluid line sets A1, B1 only each provide a line of still water, a line of carbonated water, and a line of flavoring into the central junction 52. These fluid lines angle medially from the respective fittings 56 of the medially positioned fluid line sets A1, A2 to the central junction 52, and from the central junction are fluidly connected (not depicted) to the center two dispensing heads 54, for example with flexible tubing.

Figure 9:
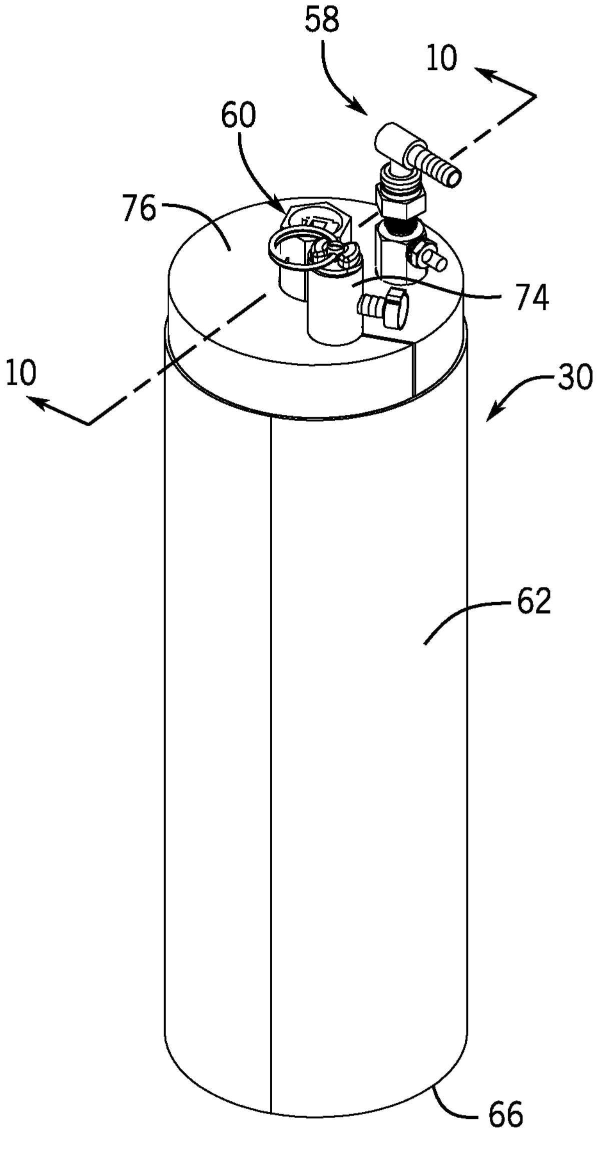
FIG. 9 is a perspective view of an example of a carbonator.
Figure 10:
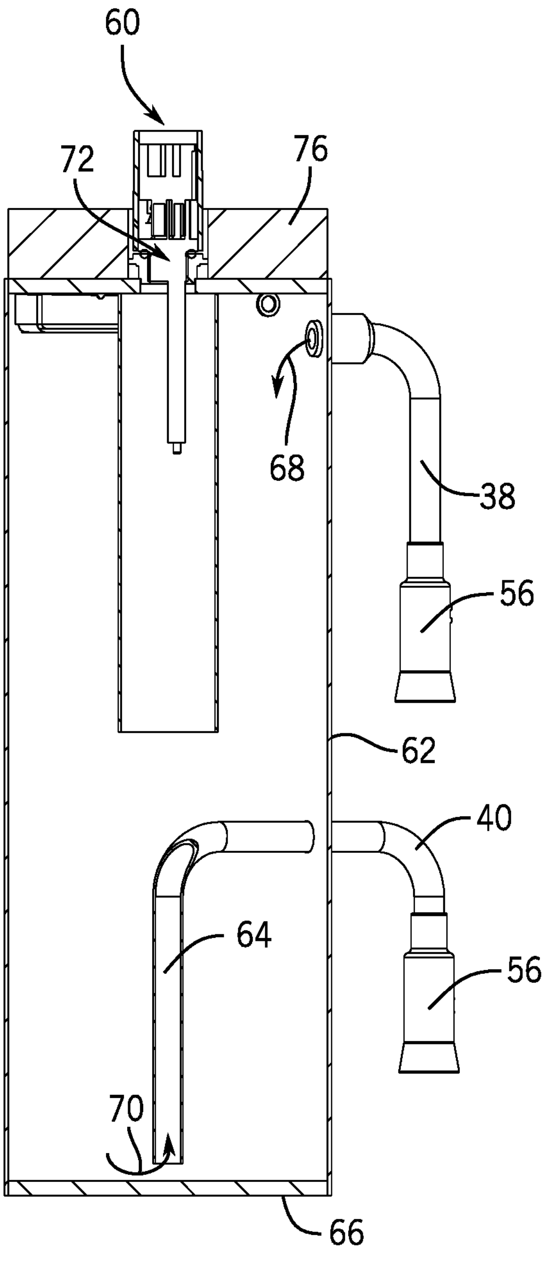
FIG. 10 is a sectional view of the carbonator taken along line 10-10 of FIG. 9.

FIG. 9 is a perspective view of an example of the carbonator 30 as may be used in the beverage dispenser 10. The carbonator 30 includes a gas inlet 58 and an electrical connection 60 located in the top 76 of a cylindrical body 62. With reference to FIG. 3, the carbonator 30 is configured such that the cylindrical body 62, the water inlet line 38, and the carbonated water outlet line 40 are all positioned at locations within the lower portion 12 of the beverage dispenser 10, and furthermore below the counter flange 20. The gas inlet 58 and the electrical connection 60 exemplarily extend vertically above the cylindrical body 62 and vertically through the counter flange 20. FIG. 10 is a sectional view of the carbonator 30 taken along line 10-10 of FIG. 9. Interior of the carbonator 30, the water inlet line 38 enters the carbonator 30 at the side of the carbonator body 62, near the top 76 of the carbonator 30 in the vertical dimension, this positions the water inlet line 38 vertically below the top 76 of the carbonator 30 and the counter flange 20 (FIG. 3). The water inlet line 38 includes a fitting 56 exemplarily configured to connect to other portions of the water inlet line 38 and into the cold plate as described above, so that the carbonator 30 receives chilled still water. The carbonated water outlet line 40 extends from the side of the carbonator body 62 as well, but at a position vertically below that of the water inlet line 38. The carbonated water outlet line 40 further includes an outlet stem 64 which extends radially interior to a vertical center axis of the carbonator 30 and then has a 90 degree bend to extend vertically along the vertical center axis of the carbonator 30 towards the bottom 66 of the carbonator 30. The carbonated water outlet line 40 includes a fitting 56 exemplarily configured to connect to other portions of the carbonated water outlet line and into the cold plate as described above to chill the carbonated water prior to dispense.

Water enters the carbonator 30 from the water inlet line 38 along arrow 68. Gas (carbon dioxide) enters the carbonator 30 through the gas inlet 58. The electrical connection 60 provides power to a level probe 72 which is used to detect the volume of water in the carbonator between an operational low volume and an operational full volume. If the operational low volume is detected by the level probe 72 a control signal is provided to the plain water source to increase the volume of water in the carbonator 30. If the operational full volume is detected, a similar control signal is provided to cease the introduction of additional water. If the interior of the carbonator 30 becomes too full, water and carbon dioxide can escape the carbonator through pressure relief valve 74. The gassified (e.g. carbonated) water leaves the carbonator through the outlet stem 64 and the carbonated water outlet line 40 along arrow 70.

Figure 11:
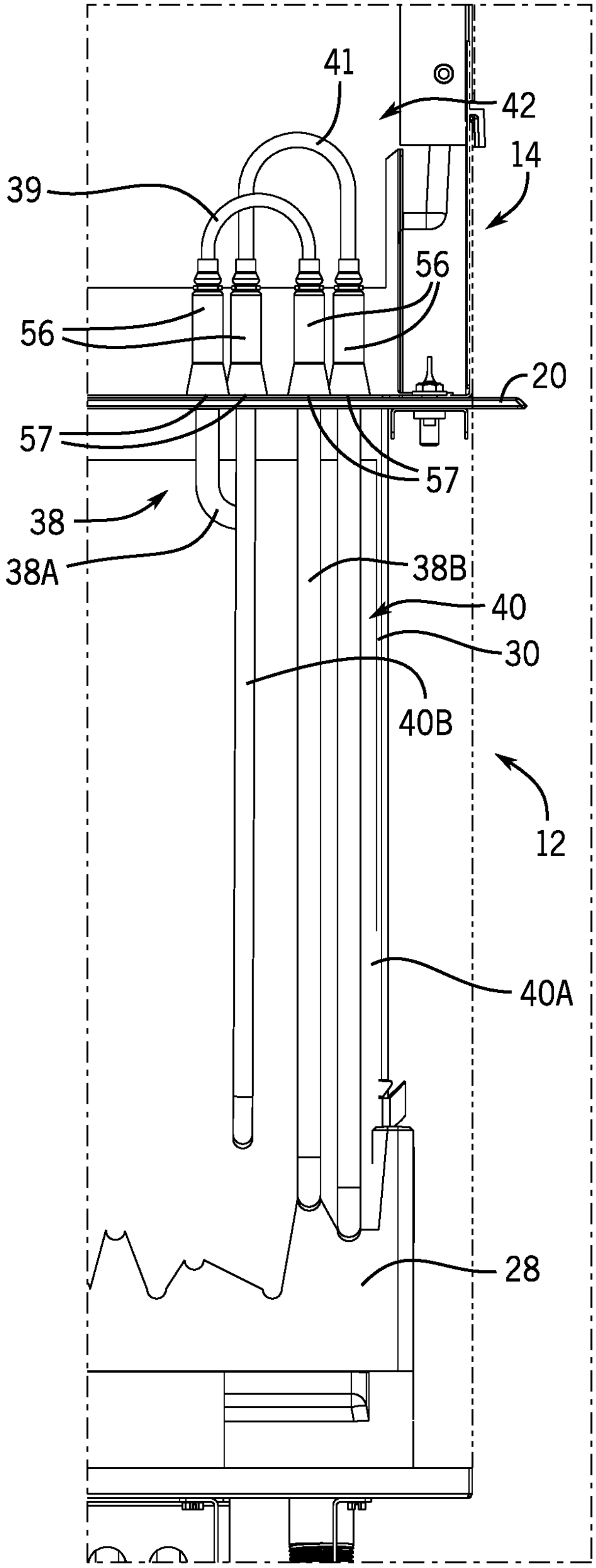
FIG. 11 is a detailed view of an example of the fluid connections between the carbonator and the cold plate.

FIG. 11 depicts an example of the fluid line connections between the carbonator 30 and the cold plate 28. As shown in the example of FIG. 11, the water inlet line 38 includes an ascending portion 38A extending from the cold plate 28 through the lower portion 12 where a fitting end 57 extends through the counter flange 20. The water inlet line 38 further includes a descending portion 38B which includes a fitting end 57, passes through the counter flange 20 and enters the carbonator 30 at the location near the top 76 of the carbonator 30. A U-shaped tube 39 is fixed in position within the insulation housing 42. Foamed in insulation surrounds the U-shaped tube 39 within the insulation housing 42. The U-shaped tube 39 includes two fittings 56 which are respectively configured to receive the fitting ends 57 of the ascending portion 38A and the descending portion 38B.

The carbonated water outlet line 40 includes an ascending portion 40A extending from the carbonator 30 near the bottom 66 of the carbonator through the lower portion 12. A fitting end 57 of the ascending portion 40A extends through and away from the counter flange 20. The carbonated water outlet line 40 further includes a descending portion 40B with a fitting end 57. The descending portion 40B passes through the counter flange 20 and the lower portion 12 to and enters the cold plate 28. A U-shaped tube 41 is fixed in position within the insulation housing 42. Foamed in insulation surrounds the U-shaped tube 41 within the insulation housing 42. The U-shaped tube 41 includes two fittings 56 which are respectively configured to receive the fitting ends 57 of the ascending portion 40A and the descending portion 40B.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A beverage dispenser comprising:

an upper portion comprising:

a beverage tower comprising a plurality of dispensing heads; and a plurality of upper fluid lines extending through the beverage tower to the plurality of dispensing heads;

a lower portion comprising:

a cold plate comprising a plurality of fluid lines running therethrough;

an ice bin in thermal contact with the cold plate;

a carbonator with a lower end of the carbonator in thermal contact with the cold plate and the carbonator extending vertically away from the cold plate;

a plurality of lower fluid lines extending from the cold plate in the direction of the beverage tower;

an enclosure surrounding the carbonator, the plurality of lower fluid lines, and at least portions of the cold plate and ice bin; and a chase that extends vertically through the upper portion and is laterally centered within the upper portion;

wherein the plurality of lower fluid lines extending from the cold plate comprise first and second fluid line sets to a first lateral side of the chase, and comprise third and fourth fluid line sets to a second lateral side of the chase, and each of the first, second, third, and fourth fluid line sets comprise one line of still water, one line of carbonated water, and at least two lines of syrup;

wherein splitters on each line of still water and each line of carbonated water divide each line of still water and each line of carbonated water into sub lines, wherein each dispensing head is connected to a still water sub line and a carbonated water sub line;

wherein a still water sub line, a carbonated water sub line, and at least one syrup line from the second fluid line set are diverted into the chase and are connected to a first dispensing head of the plurality of dispensing heads through the chase;

wherein a still water sub line, a carbonated water sub line, and at least one syrup line from the third fluid line set are diverted into the chase and are connected to a second dispensing head of the plurality of dispensing heads through the chase;

wherein a first still water sub line, a first carbonated water sub line, and a first syrup line from the first fluid line set are connected to a third dispensing head located on the first lateral side and a second still water sub line, a second carbonated water sub line, and a second syrup line from the first fluid line set are connected to a fourth dispensing head located on the first lateral side; and wherein a first still water sub line, a first carbonated water sub line, and a first syrup line from the fourth fluid line set are connected to a fifth dispensing head located on the second lateral side and a second still water sub line, a second carbonated water sub line, and a second syrup line form the second fluid line set are connected to a sixth dispensing head located on the second lateral side.

2. The beverage dispenser of claim 1, further comprising a first vertical insulation housing, wherein the first group of upper fluid lines extend within the first vertical insulation housing, the first vertical insulation housing being filled with insulation.

3. A beverage dispenser comprising:

a beverage tower comprising a plurality of dispensing heads, the plurality of dispensing heads comprising first, second, third, and fourth dispensing heads;

a cold plate comprising a plurality of fluid lines running therethrough;

an ice bin in thermal contact with the cold plate;

a carbonator with a lower end of the carbonator in thermal contact with the cold plate and the carbonator extending vertically away from the cold plate;

a plurality of lower fluid lines extending from the cold plate in the direction of the beverage tower;

a plurality of upper fluid lines respectively coupled to the plurality of lower fluid lines and extending through the beverage tower to the plurality of dispensing heads;

a chase that extends vertically to laterally separate the plurality of lower fluid lines into a first group of lower fluid lines and a second group of lower fluid lines, and the chase laterally separates the plurality of upper fluid lines into a first group of upper fluid lines and a second group of upper fluid lines, wherein the first group of lower fluid lines are connected to the first group of upper fluid lines and located to a first lateral side of the chase and the second group of lower fluid lines are connected to the second group of upper fluid lines and located to a second lateral side of the chase; and a first vertical insulation housing, wherein the first group of upper fluid lines extend within the first vertical insulation housing, the first vertical insulation housing being filled with insulation;

wherein the first group of upper fluid lines comprise a first fluid line set and a second fluid line set and each of the first fluid line set and the second fluid line set comprises: a still water line having a splitter to divide the still water line into still water sub lines; a carbonated water line having a splitter to divide the carbonated water line into carbonated water sub lines; a first flavoring line; and a second flavoring line;

wherein the first fluid line set and the second fluid line set each further comprise a third flavoring line;

wherein the still water sub lines of the first fluid line set are fluidly connected to the first and second dispensing heads and the still water sub lines of the second fluid line set are fluidly connected to the third and fourth dispensing heads;

wherein the carbonated water sub lines of the first fluid line set are fluidly connected to the first and second dispensing heads and the carbonated water sub lines of the second fluid line set are fluidly connected to the third and fourth dispensing heads;

wherein the first flavoring line of the first fluid line set is fluidly connected to the first dispensing head;

wherein the second flavoring line of the first fluid line set is fluidly connected to the second dispensing head;

wherein the third flavoring line of the first fluid line set is fluidly connected to the third dispensing head; and wherein the first, second, and third flavoring lines of the second fluid line set are fluidly connected to the fourth dispensing head.

4. The beverage dispenser of claim 2, further comprising:

a horizontal insulation housing extending from the vertical insulation housing;

wherein the plurality of dispensing heads comprises a first, second, third, and fourth dispensing heads;

wherein a still water subline and a carbonated water subline of the second fluid line set are connected to the fourth dispenser head through the horizontal insulation housing; and wherein at least one flavoring line of the first flavoring line and the second flavoring line is connected to the fourth dispenser head through the horizonal insulation housing.

5. The beverage dispenser of claim 1, further comprising:

wherein the chase terminates at a central junction connected to at least a first dispensing head and a second dispensing head of the plurality of dispensing heads;

a first vertical insulation housing, wherein the first group of upper fluid lines extend within the first vertical insulation housing; and a second vertical insulation housing, wherein the second group of upper fluid lines extend within the second vertical insulation housing;

wherein a portion of the fluid lines of the first group of upper fluid lines extend out of the first vertical insulation housing and into the central junction to connect to a first dispenser head of the plurality of dispenser heads; and wherein a portion of the fluid lines of the second group of upper fluid lines extend out of the second vertical insulation housing and into the central junction to connect to a second dispenser head of the plurality of dispenser heads.

6. The beverage dispenser of claim 1, further comprising a flange defining an upper extent of the lower portion; wherein the upper portion is removably connected to the lower portion and at least partially rests on the flange and the plurality of upper fluid lines are removably coupled to the plurality of lower fluid lines through the flange.

7. The beverage dispenser of claim 1, wherein the carbonator comprises:

a water inlet line that extends from the cold plate through a side wall of the carbonator, the side wall perpendicular to a bottom side and a top side; and a carbonated water outlet line that extends through the side wall of the carbonator and into the cold plate.

8. The beverage dispenser of claim 7, wherein the cold plate comprises a carbonator depression configured to receive the lower end of the carbonator therein, the side wall of the carbonator is cylindrical, and a thermal grease is between the lower end of the carbonator and the carbonator depression in the cold plate.

9. The beverage dispenser of claim 7, further comprising:

a flange defining an upper extent of the lower portion; wherein the upper portion is removably connected to the lower portion;

a water inlet U-shaped portion above the flange and located within the beverage tower, wherein the U-shaped portion of water inlet line fluidly connects an ascending portion of the water inlet line to a descending portion of the water inlet line; and a carbonated water outlet U-shaped portion above the flange and within the beverage tower, wherein the U-shaped portion of the carbonated water outlet line fluidly connects an ascending portion of the carbonated water outlet line to a descending portion of the carbonated water outlet line.

10. The beverage dispenser of claim 3, further comprising:

an upper portion comprising: the beverage tower, the plurality of upper fluid lines, and the first vertical insulation housing;

a lower portion comprising: the cold plate, the ice bin, the carbonator, the plurality of lower fluid lines, and the chase; and a flange defining an upper extent of the lower portion;

wherein the upper portion is removably connected to the lower portion and at least partially rests on the flange and the plurality of upper fluid lines are removably coupled to the plurality of lower fluid lines through the flange.

11. The beverage dispenser of claim 3, wherein the carbonator comprises:

a water inlet line that extends from the cold plate through a side wall of the carbonator, the side wall perpendicular to a bottom side and a top side; and a carbonated water outlet line that extends through the side wall of the carbonator and into the cold plate.

12. The beverage dispenser of claim 11, wherein the cold plate comprises a carbonator depression configured to receive the lower end of the carbonator therein, the side wall of the carbonator is cylindrical, and a thermal grease is between the lower end of the carbonator and the carbonator depression in the cold plate.

13. The beverage dispenser of claim 11, further comprising:

an upper portion comprising: the beverage tower, the plurality of upper fluid lines, and the first vertical insulation housing;

a lower portion comprising: the cold plate, the ice bin, the carbonator, the plurality of lower fluid lines, and the chase;

a flange defining an upper extent of the lower portion; wherein the upper portion is removably connected to the lower portion;

a water inlet U-shaped portion above the flange and located within the beverage tower, wherein the U-shaped portion of water inlet line fluidly connects an ascending portion of the water inlet line to a descending portion of the water inlet line; and a carbonated water outlet U-shaped portion above the flange and within the beverage tower, wherein the U-shaped portion of the carbonated water outlet line fluidly connects an ascending portion of the carbonated water outlet line to a descending portion of the carbonated water outlet line.

14. The beverage dispenser of claim 3, further comprising:

a horizontal insulation housing extending from the vertical insulation housing;

wherein the plurality of dispensing heads comprises a first, second, third, and fourth dispensing heads;

wherein a still water subline and a carbonated water subline of the second fluid line set are connected to the fourth dispenser head through the horizontal insulation housing; and wherein at least one flavoring line of the first flavoring line and the second flavoring line is connected to the fourth dispenser head through the horizonal insulation housing.

15. The beverage dispenser of claim 3, further comprising:

wherein the chase terminates at a central junction connected to at least a first dispensing head and a second dispensing head of the plurality of dispensing heads;

a second vertical insulation housing, wherein the second group of upper fluid lines extend within the second vertical insulation housing;

wherein a portion of the fluid lines of the first group of upper fluid lines extend out of the first vertical insulation housing and into the central junction to connect to a first dispenser head of the plurality of dispenser heads; and wherein a portion of the fluid lines of the second group of upper fluid lines extend out of the second vertical insulation housing and into the central junction to connect to a second dispenser head of the plurality of dispenser heads.

* * * * *